H. T. McANULTY.
EDUCATIONAL DEVICE.
APPLICATION FILED JULY 18, 1908.

925,716.

Patented June 22, 1909.
3 SHEETS—SHEET 1.

Witnesses
Edwin L. Bradford
L. O. Little

Inventor
Henry T. McAnulty
By Watson E. Coleman
Attorney

H. T. McANULTY.
EDUCATIONAL DEVICE.
APPLICATION FILED JULY 18, 1908.
925,716.
Patented June 22, 1909.
3 SHEETS—SHEET 2.
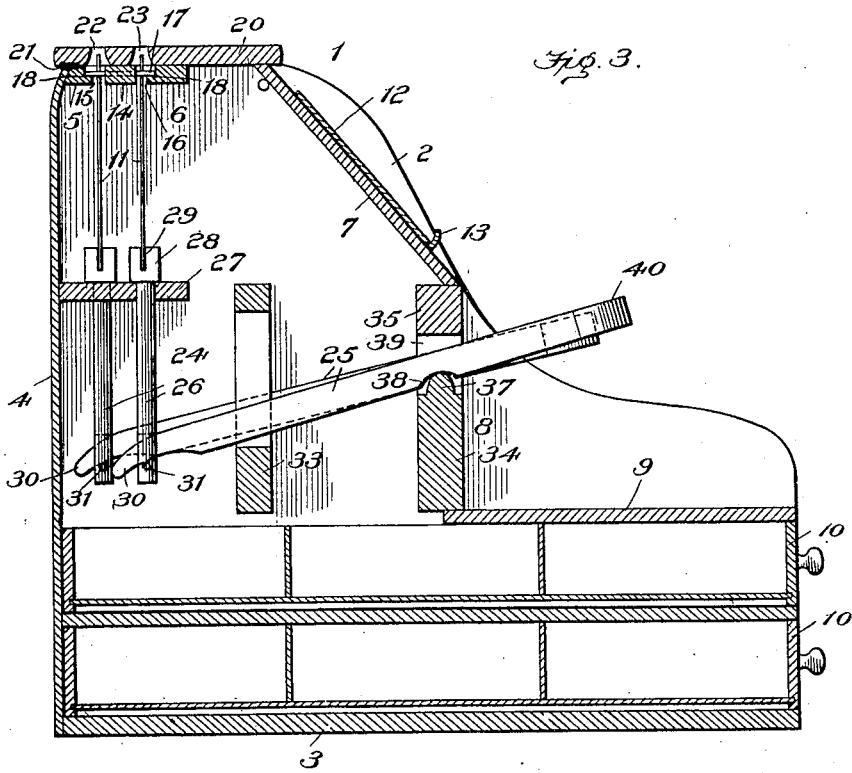
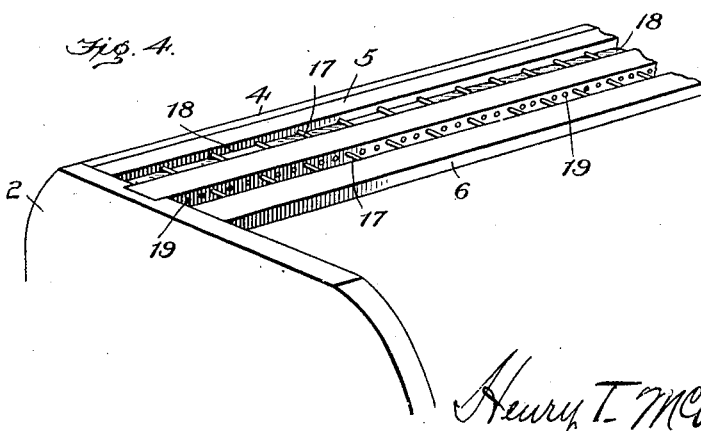
Witnesses
Edwin L. Bradford
L. O. Little
Inventor
Henry T. McAnulty,
By Watson E. Coleman
Attorney H. T. McANULTY.
EDUCATIONAL DEVICE.
APPLICATION FILED JULY 18, 1908.
925,716.
Patented June 22, 1909.
3 SHEETS—SHEET 3.
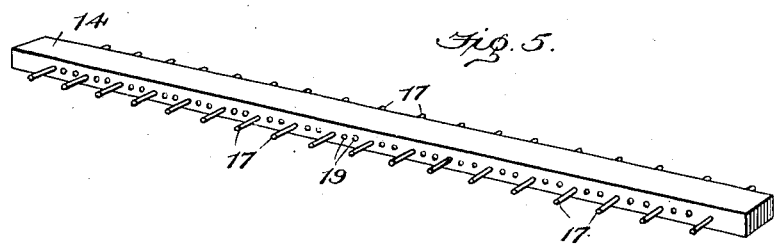
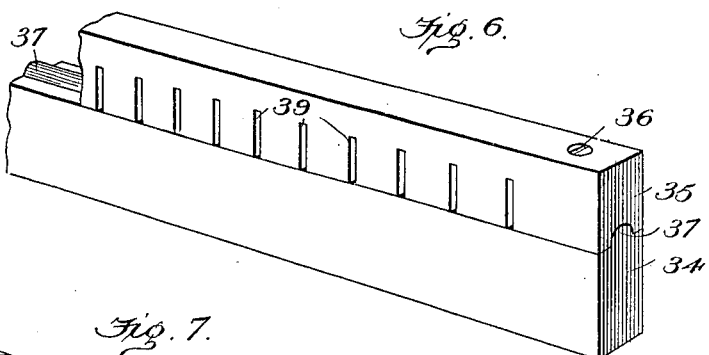
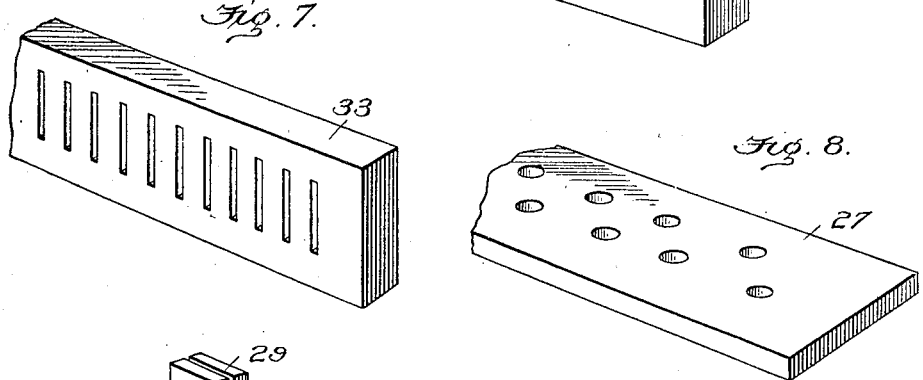
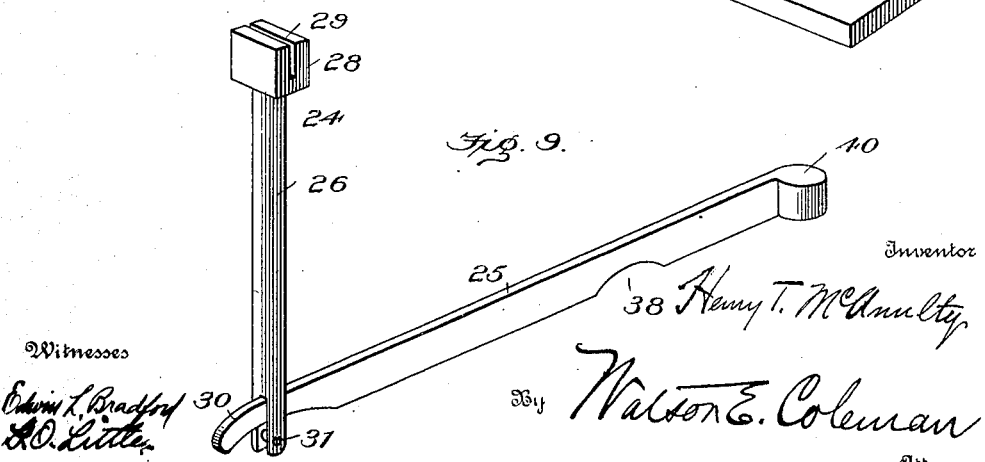

UNITED STATES PATENT OFFICE.

HENRY T. McANULTY, OF RED LAKE FALLS, MINNESOTA.

EDUCATIONAL DEVICE.

No. 925,716.      Specification of Letters Patent.      Patented June 22, 1909.

Application filed July 18, 1908. Serial No. 444,225.

*To all whom it may concern:*

Be it known that I, HENRY T. MCANULTY, a citizen of the United States, residing at Red Lake Falls, in the county of Red Lake and State of Minnesota, have invented certain new and useful Improvements in Educational Devices, of which the following is a specification, reference being had therein to the accompanying drawing.

My invention relates to improvements in devices or machines for use in teaching reading, arithmetic, history and other subjects.

The object of the invention is to provide a simple and practical device or machine of this character which will, to a great extent, dispense with the use of the blackboard and which possesses numerous advantages over similar devices and means now used to accomplish its purpose.

With the above and other objects in view, which will appear as the nature of the invention is better understood, the same consists in the novel features of construction and the combination and arrangement of parts hereinafter described and claimed, and illustrated in the accompanying drawings, in which—

Figure 1:
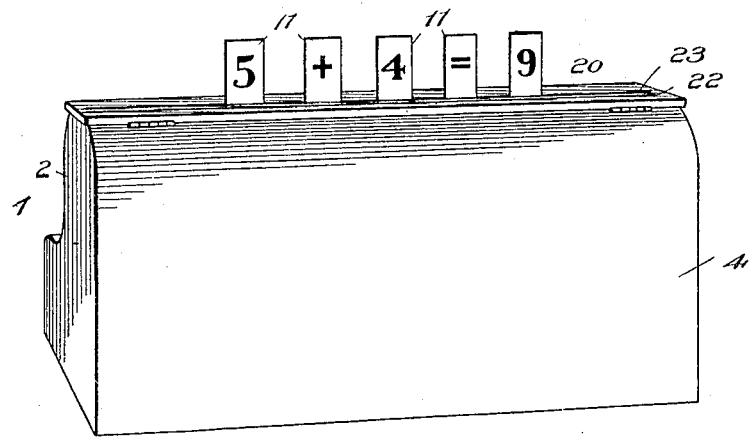
Figure 2:
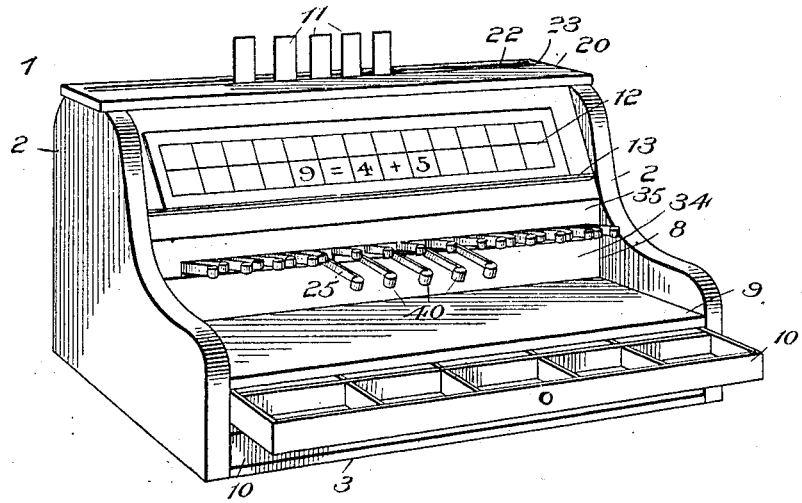

Figure 1 is a perspective view of the device looking toward the front of the same; Fig. 2 is a similar view looking toward its rear side; Fig. 3 is a vertical transverse section; Fig. 4 is a detail perspective of a portion of the top of the casing, showing the manner in which the sign cards are guided; Fig. 5 is a perspective view of the central bar for the top of the casing and the adjustable guide pins arranged in said bar; Fig. 6 is a perspective view of the fulcrum bar or support for the levers; Figs. 7 and 8 are detail perspective views of the guides for the levers and the plunger rods; and Fig. 9 is a perspective view of one of the key levers and the plunger which it actuates.

My improved educational device or machine comprises a casing or body 1 having two ends 2 united by a suitable bottom 3, a vertical front 4 and five cross bars 5, 6, 7, 8, 9, arranged upon the top and rear side of the device. The cross piece 9 which is horizontally disposed in the projecting rear portions of the sides or ends 2, is arranged above one or a plurality of sliding drawers 10. The latter are adapted to be pulled in a rearward direction out of the casing and if desired suitable partitions may be provided in them for receiving sign cards 11 and key cards 12, as hereinafter explained. The cross piece or bar 8 is disposed vertically and the cross piece 7 is arranged above the same and is preferably inclined forwardly. This cross piece 7 is so supported upon the cross bar 8 and between the sides 2 that it may be readily removed to permit of access to the interior of the casing, and upon its outer or rear face adjacent to its bottom is a horizontally projecting ledge or rib 13 adapted to serve as a support for one of the key cards 12, as presently explained. The two cross bars 5, 6 are arranged horizontally at the top of the upwardly projecting portions of the sides 2 of the casing and are spaced apart to receive between them a removable cross bar 14 which rests at its ends in seats upon the tops of the sides 2 and is of less width than the space between the opposing edges of the cross bars 5, 6 so as to form between it and said edges longitudinal openings or slots 15, 16. The sign cards 11 are adapted to be projected through these parallel slots 15, 16 by mechanism hereinafter explained, and the cards are guided in their sliding movement by cross pins 17 arranged in transverse apertures in the central bar 14 and are of such length that their projecting ends extend across the slots 15, 16 and engage longitudinal grooves 18 formed in the end bars 5, 6, as clearly shown in Fig. 4. In order to permit cards of different widths or sizes to be used in the device, the bar 14 is formed with a longitudinal row of closely arranged apertures 19 through any of which the pins 17 may be projected. It will be seen that this construction enables said pins to be positioned as far apart or as close together as may be found necessary to properly guide the vertical edges of the cards. For the purpose of retaining the apertured guide pin carrying bar 14 in its seats and between the bars 5, 6 and for the purpose of covering or hiding the upper ends of the cards, I provide a cover 20 which is hinged at 21 to the front of the casing. It is formed with two longitudinally extending slots 22, 23 which when the cover is swung down upon the bars 5, 14, 6, are adapted to register with the slots or openings 15, 16 between said bars. The slots 22, 23 have their walls flared downwardly and outwardly to guide the cards through the same, as will be readily understood upon reference to Fig. 3.

The sign cards 11 are removably engaged with and projected by the plungers 24 suitably arranged for vertical movement within the casing and adapted to be actuated by a plurality of key levers 25. While any number and arrangement of the plungers and key levers may be employed, I preferably arrange the plungers in two rows and in staggered relation with respect to each other. Each of the plungers consists of a cylindrical rod 26 adapted to slide through an aperture in a guide bar 27 and having at its upper end above said guide a head or enlargement 28 which is formed with a notch 29 to receive one of the cards 11. The lower end of the plunger rod 26 is slotted or bifurcated to loosely receive the curved rear end 30 of one of the levers. Said end of the lever is prevented from dropping out of the slotted lower end of the rod by a cross-pin 31. The levers are parallel and extend rearwardly through slots in a suitable slotted guide bar 33 and also through slots in the cross bar 8, which latter forms a fulcrum. Said cross bar 8, as clearly shown in Fig. 5, is formed of two separable sections 34, 35 adapted to be held together by screws 36 or other suitable fastenings. The inner edge of the lower section 34 is formed with a longitudinal rib or bead 37 of semi-circular shape adapted to form a pivot or fulcrum for the levers and adapted to engage similar shaped notches or recesses 3 in the bottom edges of said levers. The upper section 35 is formed in its bottom edge with a plurality of vertical slots 39 adapted to receive the key levers. Upon the projecting outer or rear ends of the levers are provided suitable keys or finger pieces 40. It will be seen that when one of the latter is depressed the front end of its lever will be elevated to project its attached plunger 24 upwardly and thereby project the card 11 carried by said plunger out of the top of the casing. When the lever is released its forward end and the plunger will drop by gravity to their normal position to lower the card into the casing and out of sight.

While the device or machine may be used in various ways and for various kinds of educational work, it is especially designed for teaching reading, writing, spelling, arithmetic, history, geography and other subjects in primary schools.

The sign or character cards 11 which are projected out of the top of the casing by depressing the key levers may be of any shape, size and construction and may contain any sort of reading matter or pictures according to the subject which is to be taught by the machine. With each device or machine is provided a plurality of sets of the sign cards 11 and a plurality of key cards 12 to be used with the cards 11. The key cards are provided for the purpose of indicating to the teacher the character of the sign cards which are arranged upon the plungers of the various key levers so that he may readily select and operate those key levers which will project the desired cards. Each of the key cards contains as many spaces as there are key levers and in each space is arranged a number, letter, word, picture or other character or sign arranged upon one of the cards 11 of the series with which such index card is to be used. The teacher who is to operate the machine arranges the cards 11 of one set in the notched heads of the plunger rods in a manner corresponding to the arrangement of the corresponding characters in the spaces upon the key card which latter is then placed upon the ledge 13 at the back of the machine to indicate the arrangement of the cards 11 within the casing so that the desired ones may be readily projected by pressing the proper key levers.

From the foregoing it will be seen that by means of this device the sign cards may be exposed for any length of time and as many times as may be desired or as may be necessary to familiarize the pupils with the lesson. This feature dispenses with the necessity of the teacher repeatedly placing the lesson upon a blackboard and then erasing the same. It also enables the teacher to bring before the class the different words in a sentence or lesson, thereby testing their knowledge of the words with more ease and efficiency than by the use of the crayon and blackboard. Since the cards may be arranged in different ways in the machine the pupils will become familiar with the words or letters of a lesson at sight and not by reason of the position of such words or letters, as is often the case when a printed chart is used.

Having thus described my invention what I claim and desire to secure by Letters Patent is:

1. A device of the character described comprising a casing, a plurality of plungers therein, a plurality of key levers for projecting said plungers, signs carried by said plungers and an adjustable means for guiding said signs.

2. A device of the character described comprising a casing, a plurality of plungers therein, a plurality of key levers for projecting said plungers, means carried by said plungers for the reception of sign cards of different sizes and guides carried by said casing and adjustable for sign cards of different sizes.

3. A device of the character described comprising a casing, a plurality of plungers therein, a plurality of key levers for projecting said plungers, means carried by said plungers for the reception of sign cards of different sizes, a bar arranged in an opening in said casing and formed with apertures and pins adjustably arranged in said apertures for guiding the sign cards carried by said plungers.

4. The combination of a casing having spaced bars formed with seats, an intermediate bar, guide pins carried by said intermediate bar to engage the seats in the first mentioned bars and means within the casing for projecting sign cards between said bars and said guide pins.

5. The combination of a casing having spaced bars formed with grooves, an intermediate bar formed with apertures, guide pins removably and adjustably arranged in said apertures and having their projecting ends engaged with the grooves in the first mentioned bars and means within the casing for projecting sign cards between said bars and said pins.

6. A device of the character described comprising a casing, plungers therein, a fulcrum bar consisting of separable sections, one section having its inner edge formed with a fulcrum rib and the other section having its opposing edge formed with slots or notches, and key levers for operating said plungers, said levers projecting through the slots in the upper section of the fulcrum bar and having notches to engage the fulcrum rib of the lower section of said bar, substantially as described.

7. The combination with a series of sign cards and a key card, of a casing, projecting elements within the casing to hold and project said sign cards, key levers for operating said elements and means for supporting said key card adjacent to said key levers, for the purpose set forth.

In testimony whereof I hereunto affix my signature in presence of two witnesses.

HENRY T. McANULTY.

Witnesses:
S. COOKE,
T. P. HAWSE.